United States Patent
Habusha et al.

(10) Patent No.: US 8,892,784 B2
(45) Date of Patent: Nov. 18, 2014

(54) ADAPTIVE APPARATUS

(71) Applicants: Adi Habusha, Moshav Alonee-Abba (IL); Rabeeh Khoury, Tarshiha (IL); Nafea Bshara, San Jose, CA (US)

(72) Inventors: Adi Habusha, Moshav Alonee-Abba (IL); Rabeeh Khoury, Tarshiha (IL); Nafea Bshara, San Jose, CA (US)

(73) Assignee: Annapurna Labs Ltd., Yoekneam (IL)

( * ) Notice: Subject to any disclaimer, the term of this patent is extended or adjusted under 35 U.S.C. 154(b) by 17 days.

(21) Appl. No.: 13/674,121

(22) Filed: Nov. 12, 2012

(65) Prior Publication Data

US 2014/0136734 A1 May 15, 2014

(51) Int. Cl.
G06F 3/00 (2006.01)
G06F 15/173 (2006.01)
G06F 13/00 (2006.01)
G06F 9/44 (2006.01)

(52) U.S. Cl.
CPC .................................... *G06F 9/4411* (2013.01)
USPC .................. 710/8; 710/15; 710/17; 709/226; 709/227; 709/229; 711/154

(58) Field of Classification Search
None
See application file for complete search history.

(56) References Cited

U.S. PATENT DOCUMENTS

| | | | | |
|---|---|---|---|---|
| 5,793,979 A * | 8/1998 | Lichtman et al. | ............. | 709/226 |
| 5,809,329 A * | 9/1998 | Lichtman et al. | ................ | 710/8 |
| 5,887,145 A * | 3/1999 | Harari et al. | .................. | 710/301 |
| 5,974,474 A * | 10/1999 | Furner et al. | ..................... | 710/8 |
| 7,797,696 B1 * | 9/2010 | Nallagatla et al. | ............ | 717/168 |
| 2002/0023179 A1 * | 2/2002 | Stanley | ............................. | 710/8 |
| 2002/0069353 A1 * | 6/2002 | Smith | ............................... | 713/1 |
| 2007/0016704 A1 * | 1/2007 | Harari et al. | ................... | 710/68 |
| 2008/0005369 A1 * | 1/2008 | Almalki et al. | ................... | 710/8 |
| 2008/0034127 A1 * | 2/2008 | Nishio | ............................ | 710/11 |
| 2010/0134818 A1 * | 6/2010 | Minamizono et al. | ....... | 358/1.13 |
| 2012/0054740 A1 * | 3/2012 | Chakraborty et al. | ............ | 718/1 |

* cited by examiner

*Primary Examiner* — Michael Sun
(74) *Attorney, Agent, or Firm* — Oren Reches

(57) ABSTRACT

There may be provided an apparatus, that may include an input/output (IO) circuit; a micro-controller; a memory module that is arranged to store multiple type identification information and multiple type configuration information; wherein the multiple type identification information allows the apparatus to be identified as being of each one of multiple types of peripheral cards; and wherein the multiple type configuration information allows the apparatus to operate each one of the multiple types; wherein the micro-controller is arranged, following a selection of a selected type out of the multiple types: to expose, to a host—that is coupled to the apparatus, a selected portion of the multiple peripheral identification information that indicates that the apparatus has a functionality of a peripheral card of the selected type; and to configure the peripheral card to interact with the host as being a peripheral card of the selected type.

24 Claims, 3 Drawing Sheets

ADAPTIVE APPARATUS

BACKGROUND OF THE INVENTION

Peripheral Component Interconnect (PCI) is defined by www.wikipedia.org as a host bus for attaching hardware devices in a host. The PCI bus supports the functions found on a micro-controller bus, but in a standardized format that is independent of any particular micro-processor. Devices connected to the bus appear to the micro-processor to be connected directly to the micro-processor bus, and are assigned addresses in the micro-processor's address space. This microprocessor can belong to the x86 microprocessor family.

Attached devices can take either the form of an integrated circuit fitted onto the motherboard itself, called a planar device in the PCI specification, or an expansion card that fits into a slot.

Typical PCI cards used in PCs include: network cards, sound cards, modems, extra ports such as USB or serial, TV tuner cards and disk controllers. PCI video cards replaced ISA and VESA cards, until growing bandwidth requirements outgrew the capabilities of PCI; the preferred interface for video cards became AGP, and then PCI Express. PCI video cards remain available for use with old PCs without AGP or PCI Express slots. It is noted that since 2003 there is also a newer version called PCI-Express PCI provides separate memory and input/output (I/O) port address spaces for the rest of the system, like an external x86 micro-processor family, 64 and 32 bits, respectively. Addresses in these address spaces are assigned by software. A third address space, called the PCI Configuration Space, which uses a fixed addressing scheme, allows software to determine the amount of memory and I/O address space needed by each device. Each device can request up to six areas of memory space or I/O port space via its configuration space registers.

In a typical system, the firmware (or operating system) queries all PCI buses at startup time (via PCI Configuration Space) to find out what devices are present and what system resources (memory space, I/O space, interrupt lines, etc.) each needs. It then allocates the resources and tells each device what its allocation is.

The PCI configuration space also contains a small amount of device type information, which helps an operating system choose device drivers for it, or at least to have a dialogue with a user about the system configuration.

In order to interact with the PCI card the operating system needs to have an appropriate driver to that PCI card—and at the absence of such a driver—should indice the user (as a result of said dialogue) to download or otherwise provide such a driver.

A PCI end point can be a storage controller that is coupled to a hard disk. Many micro-processors can host multiple operating systems that may share single PCI end point. In order to interface with the hard disk each operating system needs to have its unique storage controller or to have a synchronization mechanism that synchronizes the accesses of the different operating systems to the same hard disk.

There is a growing need to provide PCI cards that allow more efficient initialization processes.

SUMMARY

According to an embodiment of the invention a method may be provided and may be disclosed in the specification or claims. Additional embodiments of the invention include a system arranged to execute any or all of the methods described above, including any stages-and any combinations of same.

An apparatus, may include an input/output (IO) circuit; a micro-controller; a memory module that may be arranged to store multiple type identification information and multiple type configuration information; wherein the multiple type identification information allows the apparatus to be identified as being of each one of multiple types of peripheral cards; and wherein the multiple type configuration information allows the apparatus to operate each one of the multiple types; wherein the micro controller may be arranged, following a selection of a selected type out of the multiple types to expose, to a host—that is coupled to the apparatus, a selected portion of the multiple peripheral identification information that indicates that the apparatus has a functionality of a peripheral card of the selected type; and to configure the peripheral card to interact with the host as being a peripheral card of the selected type.

The micro-controller may be arranged to perform the selection of the selected type.

The micro-controller may be arranged to retrieve selection information from a selection circuit that is configurable by a manufacturer.

The micro-controller may be arranged to configure the apparatus to act as being peripheral card of the selected peripheral card type.

The micro-controller may be arranged to configure a portion of the apparatus to act as being of a peripheral card another selected type.

The micro-controller may be arranged to configure the apparatus to interact with the host as being a hard disk and to configure a communication module of the apparatus to perform network card operation with another entity that differs from the host.

The multiple types may be selected such as to include at least one type that is expected to be supported by the host without requiring the host to download a driver after a connection of the apparatus to the host.

The I/O circuit may include a plurality of buses, each bus is allocated for a different operating system hosted by the host.

The I/O circuit may include a plurality of ports, each port is allocated for a different operating system hosted by the host.

The apparatus that may be arranged to keep updated versions of state information and the multiple-type configuration information.

The apparatus may include an instruction buffer and an interception circuit; wherein the interception circuit may be arranged to intercept commands sent from the I/O circuit to the memory module and to send commands of a certain type to the instruction buffer; and wherein the micro-controller may be arranged to retrieve the commands of the certain type from the command buffer and to execute the commands of the certain type.

The commands of the certain type may be commands that modify a state of the interface card or cause a subsequent transactions with the interface card.

A method may be provide and may include, according to an embodiment of the invention, receiving or generating, by a micro-controller of an apparatus, selection information indicative of a selection of a selected type of peripheral card type out of multiple types; exposing to a host that is coupled to the apparatus, a selected portion of multiple type identification information that indicates that the apparatus has a functionality of the selected type of peripheral card, wherein the wherein the multiple type identification information allows the apparatus to be identified as being of each one of multiple types of the peripheral cards; and configuring the apparatus to interact with the host as being of the selected type, wherein the configuring is responsive to a portion of multiple type configuration information allows the apparatus to operate each one of the multiple types.

The method may include generating by the micro-controller the selection information.

The method may include receiving by the micro-controller the selection information from a selection circuit that is configurable by a user.

The method may include configuring the apparatus to act as being of the selected peripheral card.

The method may include configuring a portion of the apparatus to act as being of another selected type.

The method may include configuring the apparatus to interact with the host as being a hard disk and configuring a communication module of the apparatus to perform network card operation with another entity that differs from the host.

The multiple types may be selected such as to include at least one type that is expected to be supported by the host without requiring the host to download a driver after a connection of the apparatus to the host.

The method may include selecting the multiple types such as to include at least one type that is expected to be supported by the host without requiring the host to download a driver after a connection of the apparatus to the host.

The I/O circuit may include a plurality of buses, each bus is allocated for a different operating system hosted by the host.

The I/O circuit may include a plurality of ports, each port is allocated for a different operating system hosted by the host.

The method may include intercepting, by an interception command, commands sent from the I/O circuit to the memory module; sending commands of certain type to the instruction buffer; retrieving, by the micro-controller, the commands of the certain type from the command buffer; and executing the commands of the certain type by the micro-controller.

The commands of the certain type may be commands that modify a state of the interface card.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
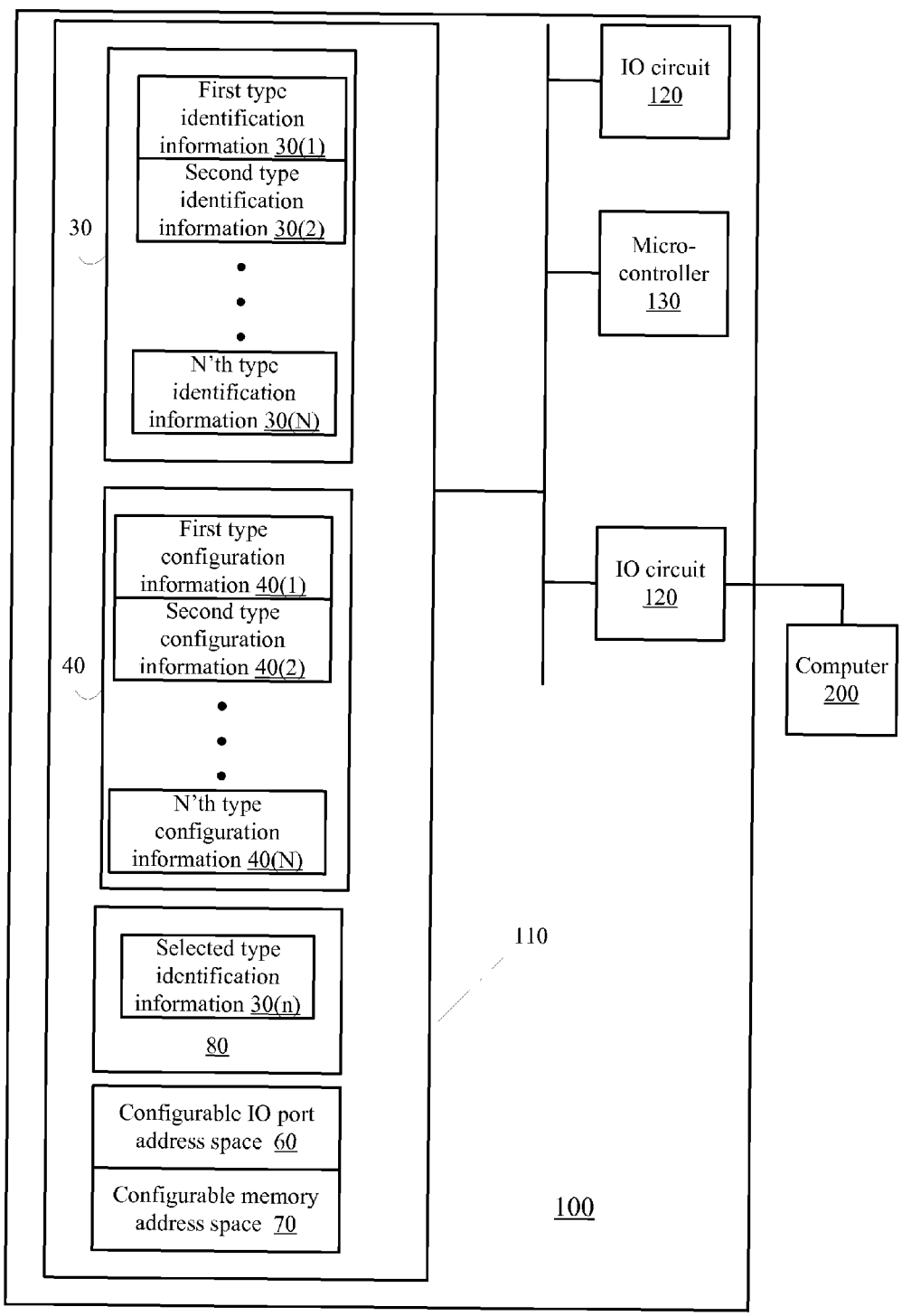
FIG. 1 illustrates an peripheral PCI End point and a host according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details may be set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 2:
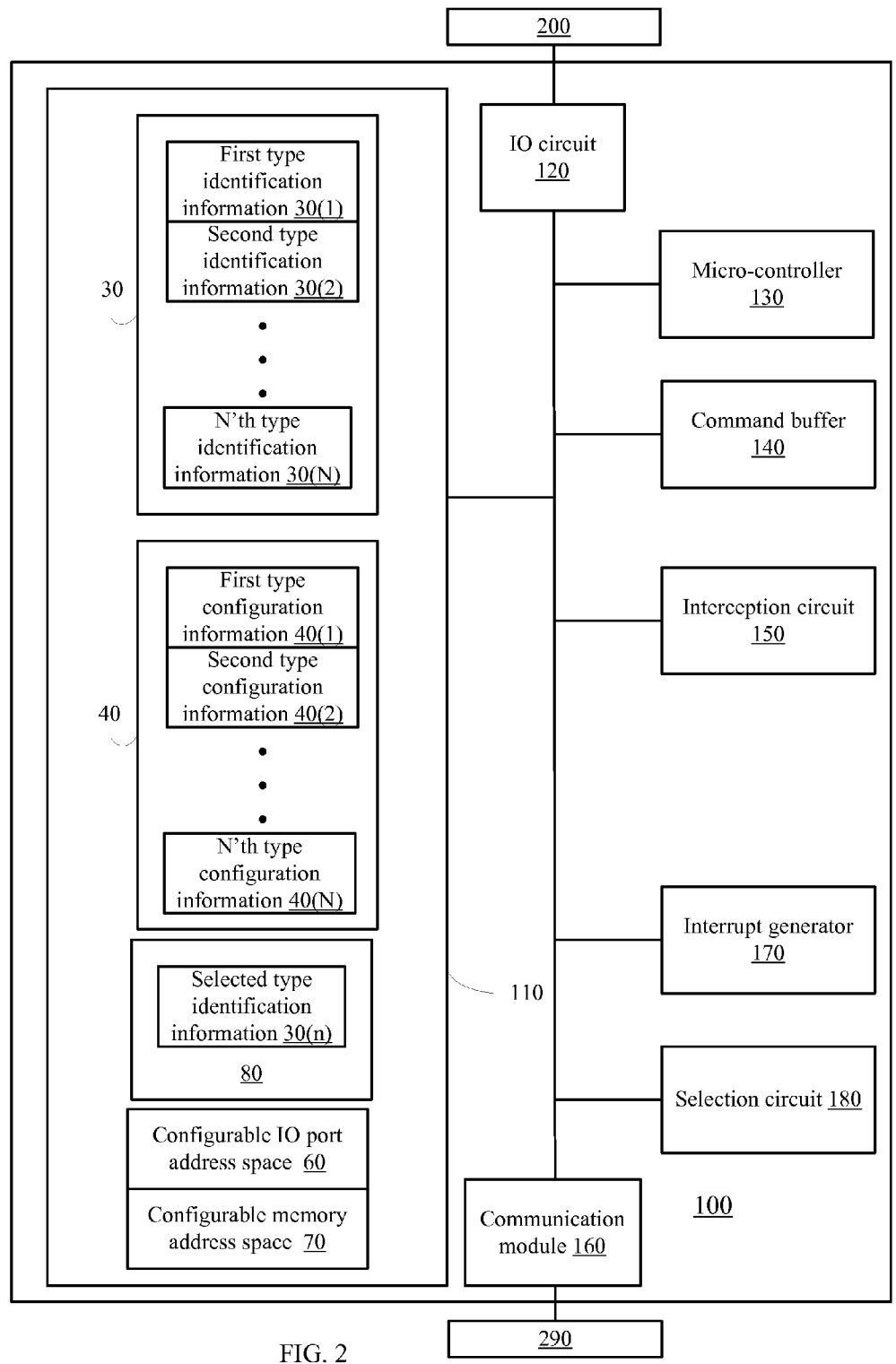
FIG. 2 illustrates an peripheral card, a host and a remote entity according to an embodiment of the invention.

FIG. 1 illustrates a peripheral PCI end-point 100 and a host micro-processor 200 according to an embodiment of the invention. FIG. 2 illustrates a peripheral card 100, a host, micro-processor 200 and a remote entity 290 according to an embodiment of the invention.

The peripheral card 100 may include an input/output (I/O) circuit 120, a memory module 110 and a micro-controller 130.

The peripheral card 100 of FIG. 2 also includes additional circuits such as command buffer 140, interception circuit 150, communication module 160, interrupt generator 160 and selection circuit 170. It is noted that peripheral card 100 of FIG. 1 can include one or more of these additional circuits.

At least one of the additional circuits (for example—interrupt generator 160) can be included in micro-controller 130.

The micro-controller 130 is arranged, following a selection of a selected type out of the multiple types, to:

a. Expose, to the host 200, a selected portion of the multiple peripheral identification information that indicates that the peripheral card is of the selected type. It may expose a pre-defined option or it could program the chip to a certain identification that will present itself to the host.

b. Configure the peripheral card to interact with the host as being of the selected type.

The memory module 110 can include one or more non-volatile memory circuits, and may also include one or more volatile memory circuits. The memory module 110 may include one or more memory chips.

The memory module 110 is arranged to store multiple type identification information 30 and multiple type configuration information 40. I may be arranged to store or it can be configured by the micro-controller at power up.

The multiple type identification information 30 allows the peripheral card 100 to be identified as being of each one of multiple types of peripheral cards, typically as a peripheral card with a pre-installed driver in the host OS The multiple type identification information 20 can include multiple portions such as multiple (N) type identification information units 30(1)-30(N), wherein each type identification information unit of 30(1)-30(N) can identify the peripheral card 100 as being of a certain type.

Different type identification information units are associated with different types of peripheral cards. These types may include, for example, a network card, a sound card, a modem, an extra port, a TV tuner card, a disk controller, a video card and the like. For example type identification information units 30(1) can identify the peripheral card 100 to host 200 as a network card, type identification information units 30(2) can identify the peripheral card 100 to host 200 as a sound card, and the like.

Once a selected type is selected the peripheral card 100 can store the selected type identification information unit 30(n) within the peripheral card configuration space 80.

Selected type identification information unit 30(n) is selected out of type identification information units 30(1)-30(N). Thus, index n ranges between 1 and N.

It is noted that although FIG. 1 shows the selected type identification information unit 30(n) as appearing twice (one copy is included in identification information units 30(1)-30(N), and the other copy is stored within configuration memory space 80), it is noted that only a single copy can be stored within the memory module 110 and the host 200 can be provided with a pointer to the selected type identification information unit 30(n)—while it (30(n)) is stored within the memory space that stores of type identification information units 30(1)-30(N).

The multiple type configuration information 40 allows the peripheral card 100 to be configured according to the selected type of peripheral card—thus allowing the peripheral card 100 to operate each one of the multiple types.

The multiple type configuration information 20 can include multiple (N) type configuration information units 40(1)-40(N), wherein each type configuration information unit of 40(1)-40(N) can configure the peripheral card 100 to interact with the host 200 as being of the selected type. This configuration may include exposing to the host 200 an I/O port address space and/or a memory address space that are expected to be exposed to the host at the selected type of interfacing circuit.

Referring to FIG. 1, the memory module 110 stores a configurable I/O port address space 60 and a configurable memory address space 70. Each of these memory spaces may be accessed by the host 200 and each can be configured in terms of size and/or internal partition to comply with the expected memory spaces expected from any of the multiple types of interfacing circuit the interfacing circuit 100 can emulate.

It is noted that a selected type configuration information unit 40(n) can be used to configure the micro-controller itself 130. For example, the micro-controller 130 can be configured to interact with the host 200 according to a specification of the selected type of interfacing circuit. The interacting may include generating interrupts (by interrupt generator 170) according to the expected specification of the selected type of peripheral card, sending requests to the host 200, answering requests from the host 200 and the like.

The selected type of the peripheral card 100 can be compliant with the PCI standard.

According to an embodiment of the invention the micro-controller 130 may be arranged to perform the selection of the selected type.

According to another embodiment of the invention micro-controller 130 is arranged to retrieve selection information from a selection circuit (now shown in FIG. 1, denoted 180 in FIG. 2) that is configurable by a user.

FIG. 2 illustrates a selection circuit 180 that can be configured by the user to indicate the type of the peripheral card that should be selected. The selection circuit 180 can include one or more switches that can set to a certain position to reflect the selected type. Alternatively, the user can burn or insert one or more fuses to indicate of the selected type. Yet according to another embodiment of the invention the user can electronically program a memory circuit of the selection circuit 180 to reflect the selection.

According to an embodiment of the invention the peripheral card 100 can interact with the host 200 as being of a selected type of a peripheral card while a portion of the peripheral card 100 may act as being of another selected type.

For example, the micro-controller 130 may be arranged to configure the peripheral card 100 to interact with the host 200 as being a hard disk and to configure communication module 160 of the peripheral card to perform network card operation with another entity that differs from the host. The communication module 180 may receive data from the host 200, data that should be stored in a hard disk, process the data to be ready to be transmitted to a remote storage device and transmit the data to the remote entity 290. The processing of the data may include packetizing the data, and encapsulating the data packets in accordance with a certain communication protocol. The communication module 180 may also request to obtain data packets from the remote entity 290, and process the data to provide it to the host 200. This processing may include extracting the data from data packets, aggregating data packets, and the like. Yet other examples of processing may include encoding and decoding, encrypting and decrypting, compressing and decompressing, data format changing and the like.

According to an embodiment of the invention the peripheral card 100 can be programmed to act as one out of multiple (N) types of peripheral cards.

These N types of peripheral cards can cover all the possible types of peripheral cards.

Alternatively—these multiple types can include a sub-set of all types of peripheral cards. This sub-set may be selected to include one or more types of peripheral cards that are expected to be supported by the host 200 without requiring the host to download a driver after a connection of the peripheral card to the host. These one or more presumably supported types may be selected based upon the popularity of peripheral card types, may be selected based upon the parameters of host 200, its expected usage, and the like.

According to various embodiment of the invention the peripheral card 100 may be arranged to interface with multiple operating systems.

This can be achieved by applying at least one of the following options:

a. (a) the I/O circuit 120 may include a plurality of buses, each bus is allocated for a different operating system hosted by the host, b. (b) the I/O circuit 120 may include a plurality of ports, each port is allocated for a different operating system hosted by the host. It should be noted that historically PCI was a shared bus, with physical single wire/pcb trace that all PCI cards/end-points connects to. When moved to PCI-E, it became a point-to-point bus with only two peers setting on it. Once its point-to-point bus, its easier to call it PCI-E port than bus.

The above sections explained how an identity is selected and established. The following paragraph provides a brief overview how a typical host—host interact with a PCI end-point/card. (1) There are host-initiated transactions and PCI End-point initiated transactions. (2) Host initiated transactions are typically memory-mapped Read or Write commands, and each Read or Write command can be classified as "state-alternating" or "state-preserving". A "state-alternative" read or write command is such that it should initiate some other work or change certain conditions in the device, while a "state-preserving" command is one that may get or set some values, but would not require any other consequent things to be done"

The host can expect to see a set of memory regions and registers that are specific to the specific PCI end-point selected. For example, if this end-point is a serial-ATA storage controller, then there is a set of memory regions and device registers that specified by the AHCI (Advanced Host Controller interface). These memory regions and device registers are the ones used by the drivers running on the host during host-initiated transactions.

According to an embodiment of the invention the command buffer 140 may be used for buffering, in a sequential order of issue, all host-initiated READ or WRITE commands to be executed by the peripheral card. As a way of optimization, it may only buffer the "State-alternating" commands.

According to another embodiment of the invention the command buffer 140 may be used for buffering or only certain types of instructions.

These certain types of instructions may include commands that change the state of the peripheral card 100. Instructions that change the status of the peripheral card 100 may include read modify commands and write modify commands. A read modify command may change a status of a auto clear counter—as the auto clear counter resets itself after being read once.

Assuming that only the certain types of commands are buffered in the command buffer 140 then these certain types of commands can be intercepted by interception circuit 150 and stored in sequential order the command buffer 140 to be fetched and executed by micro-controller 130, to perform the subsequent actions required with such a command. Storing them in sequential order is critical in most of the cases as the order of the execution of these command determine the actual result and different order can cause different results For non-state alternating commands, and if the command is not intercepted, then there should be a memory-mapped region or device registers that these command can access, and that memory-mapped region or device register would have the most up to date information. Typically, these are static configured-once information, or information the micro-controller 130 update during the operation of the device.

Figure 3:
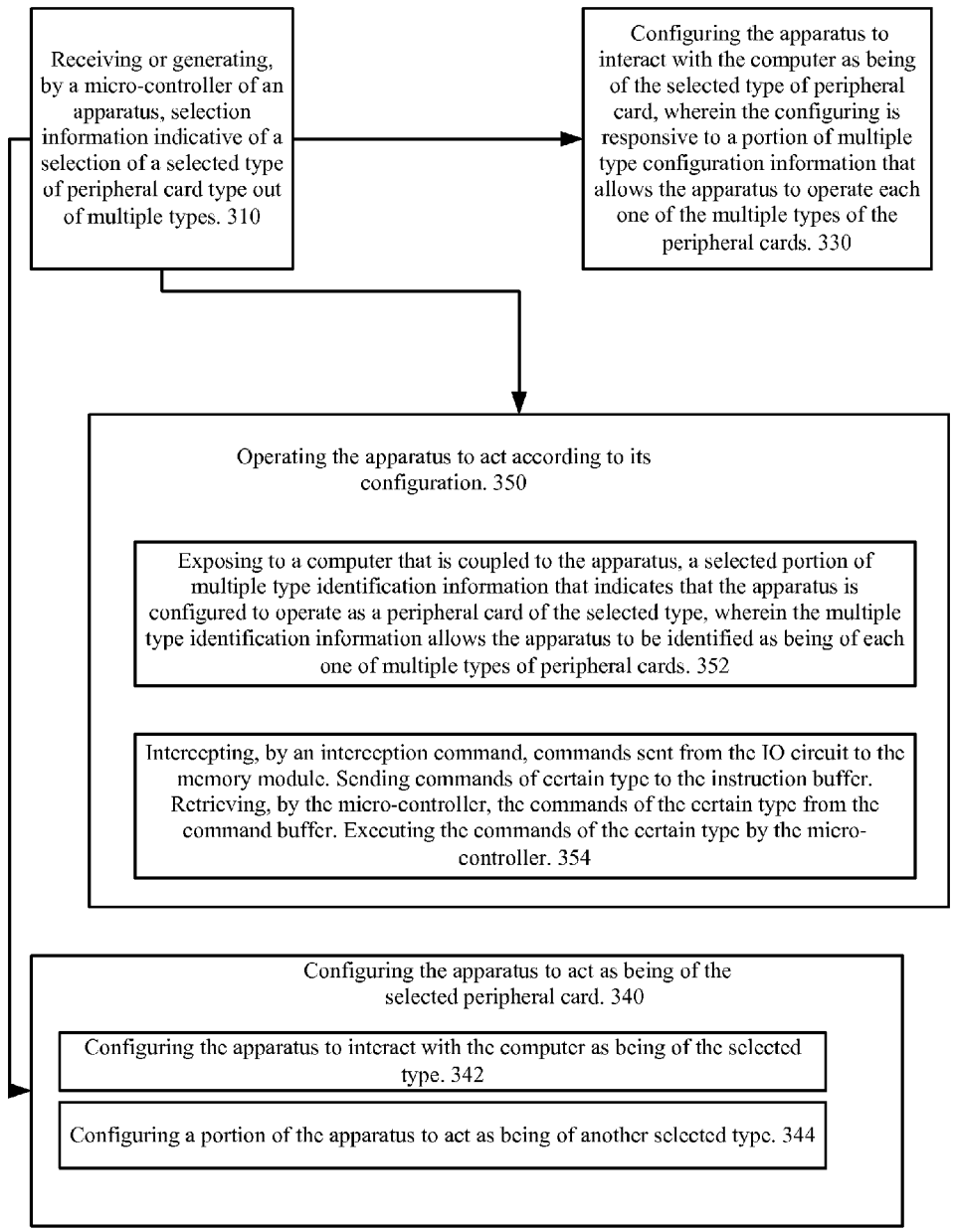
FIG. 3 illustrates a method according to an embodiment of the invention.

FIG. 3 illustrates a method 300 according to an embodiment of the invention.

Method 300 may include start by stage 310 of receiving or generating, by a micro-controller of an apparatus, selection information indicative of a selection of a selected type of peripheral card type out of multiple types.

Stage 310 may include selecting the multiple types of peripheral card such as to include at least one type that is expected to be supported by the host without requiring the host to download a driver after a connection of the peripheral card to the host.

Stage 310 may include receiving selection information that selects the multiple types such as to include at least one type that is expected to be supported by the host without requiring the host to download a driver after a connection of the peripheral card to the host.

Stage 310 may include generating by the micro-controller the selection information.

Stage 310 may include receiving by the micro-controller the selection information from a selection circuit that is configurable by a user.

Stage 310 may be followed by stage 330 or 340.

Stage 330 may include configuring the apparatus to interact with the host as being of the selected type of peripheral card, wherein the configuring is responsive to a portion of multiple type configuration information that allows the peripheral card to operate each one of the multiple types.

Stage 340 may include configuring the apparatus to act as being of the selected peripheral card type.

Stage 340 may include stage 342 of configuring the apparatus to interact with the host as being a peripheral card of the selected type.

Stage 340 may include stage 344 of configuring a portion of the apparatus to act as being of a peripheral card of another selected type.

Stage 344 may include, for example, configuring the apparatus to interact with the host as being a hard disk and configuring a communication module of the peripheral card to perform network card operation with another entity that differs from the host.

Either one of stages 330 and 340 may be followed by stage 350 of operating the apparatus to act according to its configuration.

It is noted that the method may include allowing commands that are not intercepted to go straight to the memory module. The method may also include keeping up to date, by the micro-controller (for example in a background process during a normal operation mode) relevant memory module regions that are accessed by the host.

Stage 350 may include stage 352 of exposing to a host that is coupled to the apparatus, a selected portion of multiple type identification information that indicates that the apparatus is of the selected type, wherein the wherein the multiple type identification information allows the apparatus to be identified as being of each one of multiple types.

The configuration information may inform the PCI end-point/device how configure its own memory space to the set of memory regions and device registers that the host drivers expects to see. Stage 340 may include performing the configuration of the memory space according to the "configuration information".

Stage 350 may include stage 354 of intercepting, by an interception command, commands sent from the I/O circuit to the memory module; sending commands of certain type to the instruction buffer; retrieving, by the micro-controller, the commands of the certain type from the command buffer; and executing the commands of the certain type by the micro-controller.

The commands of the certain type are commands that modify a state of the interface card.

PCI End-point initiated transactions toward to the host may also be executed. They may include: (A) data movement from/to the host memory to the PCI End-point device, or (B) Asynchronous notification messages in a form of interrupts, which could be in a format of a pulled-down wire, or a message-signaled interrupt. The micro-controller is responsible on coordinating both of these transactions, in according to the what is expected by the host driver.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A peripheral card, comprising:
    an input/output (I/O) circuit;
    a micro-controller;
    a memory module that is arranged to store multiple type identification information and multiple type configuration information;
        wherein the multiple type identification information allows the peripheral card to be identified by a host coupled to the peripheral card as being of any type out of multiple types of peripheral cards; and
        wherein the multiple type configuration information allows the peripheral card to operate each one of the multiple types of peripheral cards;

wherein the micro-controller is arranged, following a selection of a selected type of peripheral card out of the multiple types of peripheral cards:
to expose, to the host, a selected portion of the multiple peripheral identification information that indicates that the apparatus peripheral card has a functionality of a peripheral card of the selected type; and
to configure the peripheral card to interact with the host as being a peripheral card of the selected type.

2. The peripheral card according to claim 1, wherein the micro-controller is arranged to perform the selection of the selected type.

3. The peripheral card according to claim 1, wherein the micro-controller is arranged to retrieve selection information from a selection circuit that is configurable by a manufacturer.

4. The peripheral card according to claim 1, wherein the micro-controller is arranged to configure the peripheral card to act as being peripheral card of the selected peripheral card type.

5. The peripheral card according to claim 1, wherein the micro-controller is arranged to configure a portion of the peripheral card to act as being of another selected type of peripheral card.

6. The peripheral card according to claim 1, wherein the micro-controller is arranged to configure the apparatus to interact with the host as being a hard disk and to configure a communication module of the apparatus to perform network card operation with another entity that differs from the host.

7. The peripheral card according to claim 1, wherein the multiple types of peripheral cards are selected such as to include at least one type that is expected to be supported by the host without requiring the host to download a driver after a connection of the peripheral card to the host.

8. The peripheral card according to claim 1, wherein the I/O circuit comprises a plurality of buses, each bus is allocated for a different operating system hosted by the host.

9. The peripheral card according to claim 1, wherein the I/O circuit comprises a plurality of ports, each port is allocated for a different operating system hosted by the host.

10. The peripheral card according to claim 1, that is arranged to keep updated versions of state information and the multiple-type configuration information.

11. The peripheral card according to claim 1, comprising an instruction buffer and an interception circuit;
wherein the interception circuit is arranged to intercept commands sent from the I/O circuit to the memory module and to send commands of a certain type to the instruction buffer and not to send commands of another type to the instruction buffer; and
wherein the micro-controller is arranged to retrieve the commands of the certain type from the command buffer and to execute the commands of the certain type.

12. The peripheral card according to claim 10, wherein the commands of the certain type are commands that modify a state of the peripheral card or cause a subsequent transactions with the inter fee peripheral card.

13. A method, comprising:
receiving or generating, by a micro-controller of a peripheral card, selection information indicative of a selection of a selected type of peripheral card type out of multiple types of peripheral cards;
exposing to a host that is coupled to the peripheral card, a selected portion of multiple type identification information that indicates that the peripheral card has a functionality of the selected type of peripheral card, wherein the multiple type identification information allows the peripheral card to be identified as being of any type of multiple types of the peripheral cards; and
configuring the peripheral card to interact with the host as being of the selected type of peripheral card, wherein the configuring is responsive to a portion of the multiple type configuration information.

14. The method according to claim 13, comprising generating by the micro-controller the selection information.

15. The method according to claim 13, comprising receiving by the micro-controller the selection information from a selection circuit that is configurable by a user.

16. The method according to claim 13, comprising configuring the peripheral card to act as being of the selected type of peripheral card.

17. The method according to claim 13, comprising configuring a portion of the peripheral card to act as being of another selected type of peripheral card.

18. The method according to claim 13, comprising configuring the peripheral card to interact with the host as being a hard disk and configuring a communication module of the peripheral card to perform network card operation with another entity that differs from the host.

19. The method according to claim 13, wherein the multiple types of peripheral cards are selected such as to include at least one type of peripheral card that is expected to be supported by the host without requiring the host to download a driver after a connection of the peripheral card to the host.

20. The method according to claim 13, wherein the selected portion of multiple type identification information is stored in configuration memory space and included in an identification information unit out of multiple identification units that correspond to the multiple types of peripheral cards.

21. The method according to claim 13, wherein the I/O circuit comprises a plurality of buses, each bus is allocated for a different operating system hosted by the host.

22. The method according to claim 13, wherein the I/O circuit comprises a plurality of ports, each port is allocated for a different operating system hosted by the host.

23. The method according to claim 13, comprising intercepting, by an interception command, commands sent from the I/O circuit to the memory module; sending only commands of certain type to the instruction buffer; retrieving, by the micro-controller, the commands of the certain type from the command buffer; and executing the commands of the certain type by the micro-controller.

24. The method according to claim 23, wherein the commands of the certain type are commands that modify a state of the interface card.

* * * * *